United States Patent [19]

Hutchings et al.

[11] Patent Number: 5,347,359
[45] Date of Patent: Sep. 13, 1994

[54] APPARATUS AND METHOD FOR CORRECTING RING LASER GYROSCOPE PHASE ANGLE ERRORS INDUCED BY LOCK-IN

[75] Inventors: Thomas J. Hutchings, Canoga Park; Edward Kanegsberg, Pacific Palisades; Sheridan W. Hammons, Thousand Oaks; Daryl C. Stjern, deceased, late of Thousand Oaks; Edmund W. Rusche, legal representative, Thousand Oaks, all of Calif.

[73] Assignee: Litton Systems, Inc., Beverly Hills, Calif.

[21] Appl. No.: 110,003

[22] Filed: Oct. 19, 1987

[51] Int. Cl.$^5$ .................. G01B 9/02; H01S 3/083
[52] U.S. Cl. ........................... 356/350; 372/94
[58] Field of Search ............... 356/350; 372/94

[56] References Cited

U.S. PATENT DOCUMENTS 4,648,716  3/1987  Egli ........................ 356/350

*Primary Examiner*—Stephen C. Buczinski
*Attorney, Agent, or Firm*—Lynn & Lynn

[57] ABSTRACT

Phase errors that occur when a dithered ring laser gyroscope enters its deadband are measured, and a correction is applied to the output of the ring laser gyroscope to compensate for these phase errors. The counter-propagating beams in a ring laser gyroscope are heterodyned to produce a pair of quadrature heterodyne signals that indicate the angular output of the laser ring laser gyroscope. The phase angle error between one of the heterodyne signals and either the sum or difference of the separate beam intensities is determined, The phase angle error signal is used to produce a control signal for adjusting the output of the ring laser gyroscope to correct for errors introduced at or near turnarounds in the dither cycle.

18 Claims, 5 Drawing Sheets

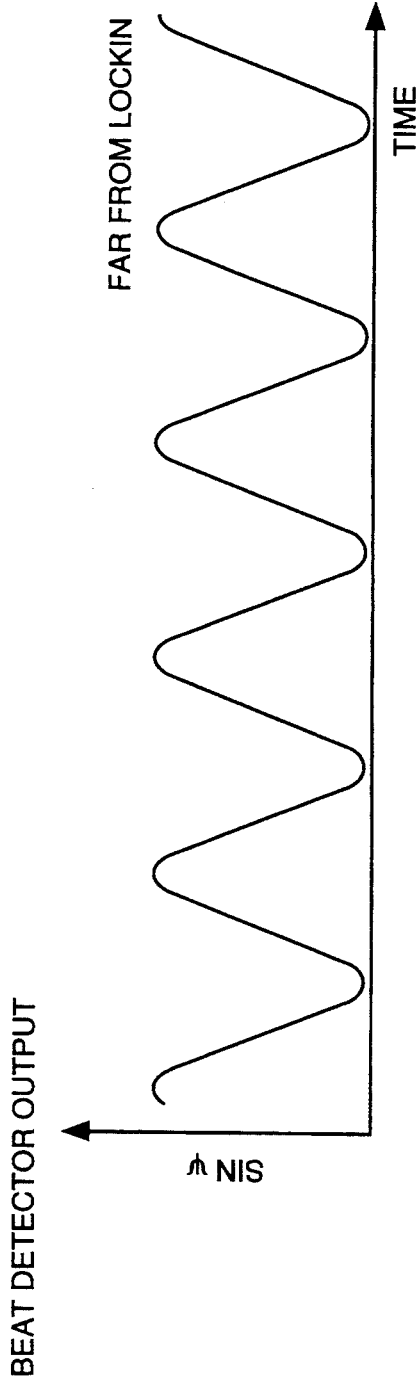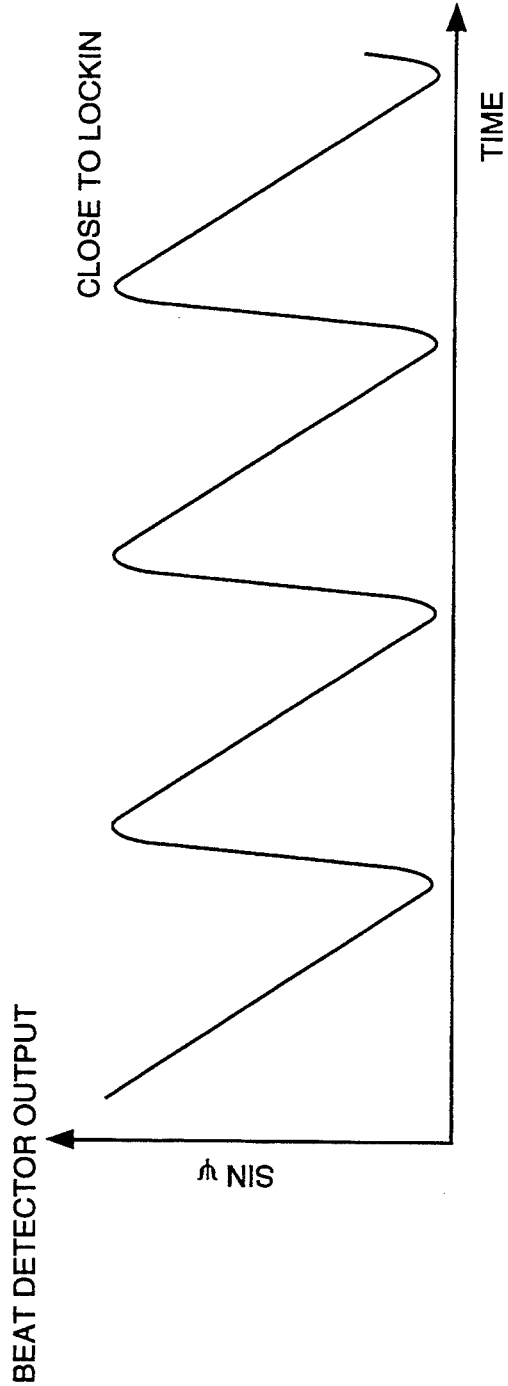

APPARATUS AND METHOD FOR CORRECTING RING LASER GYROSCOPE PHASE ANGLE ERRORS INDUCED BY LOCK-IN

BACKGROUND OF THE INVENTION

This invention relates generally to rotation sensors and particularly to Sagnac ring rotation sensors. More particularly, the present invention relates to a ring laser gyroscope angular rate sensor. Still more particularly, this invention relates to methods and apparatus for correcting phase angle error occurring in a laser ring laser gyroscope that is dithered to overcome lock-in.

A ring laser gyroscope employs the Sagnac effect to detect rotation. Counter propagating light beams in a closed loop will have transit times that differ in direct proportion to the rotation rate of the loop about an axis perpendicular to the plane of the loop. The ring laser gyroscope uses the resonant properties of a closed cavity to convert the Sagnac phase difference between the counter propagating beams into a frequency difference. In an active ring laser gyroscope the cavity defined by the closed optical path becomes an oscillator, and output beams from the two directions interfere to give a beat frequency that is a measure of the rotation rate. The high optical frequencies of about $10^{15}$ Hz for light used in ring laser gyroscopes cause the minute phase changes to become beat frequencies that are readily measured.

When the rotation rate of a ring laser gyroscopes is within a certain range, the frequency difference between the beams disappears. This phenomenon is called frequency lock-in, or mode locking, and is a major difficulty with the ring laser gyroscope because at low rotation rates it causes a false indication that the device is not rotating. The range of rotation rates over which lock-in occurs is the deadband of the ring laser gyroscope.

Lock-in is believed to arise from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

Any inability to accurately measure low rotation rates reduces the effectiveness of a ring laser gyroscope in a navigational system. There has been substantial amount of research and development work to reduce or eliminate the effects of lock-in and to enhance the effective use of ring laser gyroscopes in such systems.

There are several known approaches to solving the problems of lock-in. Various biasing techniques have been employed to avoid the dead band so that lock-in would not be a problem in ring laser gyroscope operation. Biasing techniques can be divided into mechanical and optical techniques and into fixed and dithered bias techniques.

One approach involves mechanically oscillating the ring laser gyroscope about its sensor axis so that the device is constantly sweeping through the deadband. This mechanical oscillation of the ring laser gyroscope is usually called dithering. A typical ring laser gyroscope may be dithered at about 400 Hz with an angular displacement of a few arc minutes.

The amplitude of the dithering must be carefully controlled and monitored to minimize the effects of lock-in. Since the dither oscillation angular velocity and displacement relative to a support structure can be constantly monitored, they may be excluded from the output signal of the ring laser gyroscope. However, it has been found that a constant dithering amplitude is inadequate to eliminate all of the effects of lock-in.

One approach to reducing lock-in error is to superimpose a random signal upon the amplitude of the dither driving amplifier. A random bias technique is described in U.S. Pat. No. 3,467,472. Several rather severe disadvantages to the random bias technique have been found, however. The phase error, even though randomized by the technique described in this patent, is not eliminated and still remains a relatively large source of error.

Mirror dither is another approach that has been investigated in attempts to reduce the effects of lock-in. One or more of the mirrors that define the optical path may be oscillated at a very small amplitude. The Doppler effect causes a difference between the frequency of backscattered light and forward reflected light. Transverse dithering of all four mirrors of a rectangular ring laser gyroscope shifts only the frequency of the backscattered beam. However, transverse mirror dither is difficult to implement because of the large amount of energy required to move mirrors that are mounted to the ring laser gyroscope body. Longitudinal mirror dither is easier to implement, but it shifts the frequencies of both the forward and backscattered light. Therefore, the analysis of signals in a longitudinally mirror dithered ring laser gyroscope is complicated.

U.S. Pat. No. 3,373,650 to Killpatrick discloses a dithering system in which a varying bias in the frequency is applied to at least one of the counterpropagating beams. Killpatrick discloses a Faraday cell and two quarter wave plates in the path of the counterpropagating light beams. The Faraday cell includes a coil that is energized by an oscillatory current to produce an oscillatory magnetic field that interacts with the counterpropagating beams. The varying bias causes a varying frequency difference between the counterpropagating beams. This frequency difference is generally greater than the frequency difference that occurs at the lock-in threshold. The polarity of the frequency difference is periodically alternated so that the time integral of the frequency difference over the time interval between sign reversals is substantially zero.

When the sign of the frequency difference reverses, the two beams tend to lock-in since at some point the frequency difference between the beams is zero. Since the output angle of the ring laser gyroscope is generally derived from the frequency difference, which locks in to indicate a zero rotation rate even if the actual rotation rate is non-zero, an error accumulates in the output angle. The periods of time when the two beams are locked in are usually very short so that the resulting output angle error is very small for any single sign change. Nevertheless, the error resulting from lock-in during sign reversal of the frequency difference is cumulative, and in time may become significant, particularly in precision navigational systems. This error is usually the major contributor to the random walk or random drift.

U.S. Pat. No. 4,529,311 to Morgan et al. is directed to a ring laser gyros system in which the phase relationship between a pair of beams is accounted for. This phase may be used in a feedback loop for error control or it may be utilized to generate a set of error parameters for error correction. Morgan et al. regards the phase offset and the coupling efficiency of the two beams as being independent of time and temperature. However, the phase offset and the beam coupling efficiency are time and temperature dependent, which limits the accuracy of the error correction disclosed in Morgan et al.

U.S. Pat. No. 4,248,534 to Elbert is directed to the elimination of errors induced in dithered ring laser gyroscopes. Elbert discloses the use of a regression algorithm for minimizing lock-in. For a short time on both sides of zero velocity a trace of the rotation rate is stored in a computer memory. When there is no lock-in, this trace is a parabola. Deviations from the parabola are indicative of the lock-in rate.

U.S. Pat. No. 4,473,297 to Simpson et al. is directed to the use of phase differences between the alternating components in the counterpropagating beams to minimize lockin in a ring laser gyroscope. Signals indicative of the phase differences in the separate beams are input to a mirror driver circuit that drives two cavity length control mirrors to control the phase difference. Simpson et al discloses that the preferred phase difference between the beams for minimum lock-in is 180°.

SUMMARY OF THE INVENTION

This invention provides a method and apparatus for measuring the phase error that occurs at each dither zero crossover in a dithered ring laser gyroscope and compensating for phase error in the signal output from the ring laser gyroscope.

A ring laser gyroscope according to the present invention has a frame with a cavity therein for guiding a first light beam having an intensity $I_1$ in a clockwise direction around the cavity and a second light beam having an intensity $I_2$ in a counterclockwise direction around the cavity. The ring laser gyroscope includes means for dithering the frame in a dither cycle at a vibration frequency $\omega$ and a vibration amplitude d. The invention includes means for heterodyning the beams to produce a pair of quadrature heterodyne signals that are function of the sine and cosine of the angular output of the laser ring laser gyroscope. Phase measuring means determines a signal indicative of the phase angle between one of the heterodyne signals and a signal selected from an intensity sum signal indicative of $I_1 + I_2$ and an intensity difference signal indicative of $I_1 - I_2$. The invention includes means for combining the selected heterodyne signal and the phase angle signal to determine a phase error signal; and means for processing the phase error signal to produce a control signal for adjusting the output of the ring laser gyroscope to correct for errors introduced at turnarounds in the dither cycle. The phase measuring means may comprise demodulator means for processing either the intensity sum or the intensity difference signal to produce signals indicative of the magnitude and phase of the signal intensity sum or intensity difference relative to a selected one of the heterodyne signals.

The ring laser gyroscope according to the invention may further include means for detecting turnarounds in the dither cycle; and means for adjusting the output of the ring laser gyroscope only during turnarounds in the dither cycle. The invention may further include means for determining the time duration of each turnaround in the dither cycle. The means for determining the time required for each turnaround may comprise means for measuring zero crossings in the output of the heterodyning means.

The means for processing the phase error signal to produce a control signal may include means for determining the product of the sine of the phase error angle and the magnitude of the lock-in coefficient. The processing circuitry may also include means for measuring the time required for each turnaround in the dither cycle and means for integrating the product of the sine of the phase error angle and the magnitude of a lock-in coefficient over the turnaround time.

The method according to the present invention for correcting errors that occur at turnarounds in a dithered ring laser gyroscope having a frame with a cavity therein for guiding a first light beam having an intensity $I_1$ in a clockwise direction around the cavity and a second light beam having an intensity $I_2$ in a counterclockwise direction around the cavity comprises the steps of heterodyning the first and second beams to produce a pair of quadrature heterodyne signals that are functions of the sine and cosine of the angular output of the laser ring laser gyroscope. The method includes the steps of determining a phase signal indicative of the phase angle between a signal selected from the heterodyne signals and a signal selected from an intensity sum signal indicative of $I_1 + I_2$ and an intensity difference signal indicative of $I_1 - I_2$ and combining the chosen heterodyne signal and the phase signal to determine a phase error signal. The method also includes the step of processing the phase error signal to produce a control signal for adjusting the output of the ring laser gyroscope to correct for errors introduced at turnarounds in the dither cycle. The phase measuring step in the method of the invention preferably comprises the step of demodulating one of the signals $I_1 + I_2$ or $I_1 - I_2$ to produce signals indicative of the magnitude and phase of the signal $I_1 + I_2$ or $I_1 - I_2$ relative to a selected one of the heterodyne signals.

The method of the present invention may further include the steps of means for detecting turnarounds in the dither cycle; and adjusting the output of the ring laser gyroscope only during turnarounds in the dither cycle. The method of may further include the step of determining a time duration of each turnaround in the dither cycle.

The step of processing the phase error signal to produce a control signal preferably includes the steps of determining the sine of the phase error angle; determining the magnitude of a lock-in coefficient; determining the product of the sine of the phase error angle and the magnitude of a lock-in coefficient; measuring the time required for each turnaround in the dither cycle; and integrating the product of the sine of the phase error angle and the magnitude of a lock-in coefficient over the time required for each turnaround in the dither cycle. The step of determining the time required for each turnaround may comprise the step of measuring zero crossings in the output of the heterodyning means.

BRIEF DESCRIPTION OF THE DRAWINGS

FIGS. 6A and 6B illustrate the output waveform of the ring laser gyroscope of FIG. 1 for rotation rates far from the lock-in threshold and near the lock-in threshold, respectively;

DESCRIPTION OF THE PREFERRED EMBODIMENT

Figure 1:
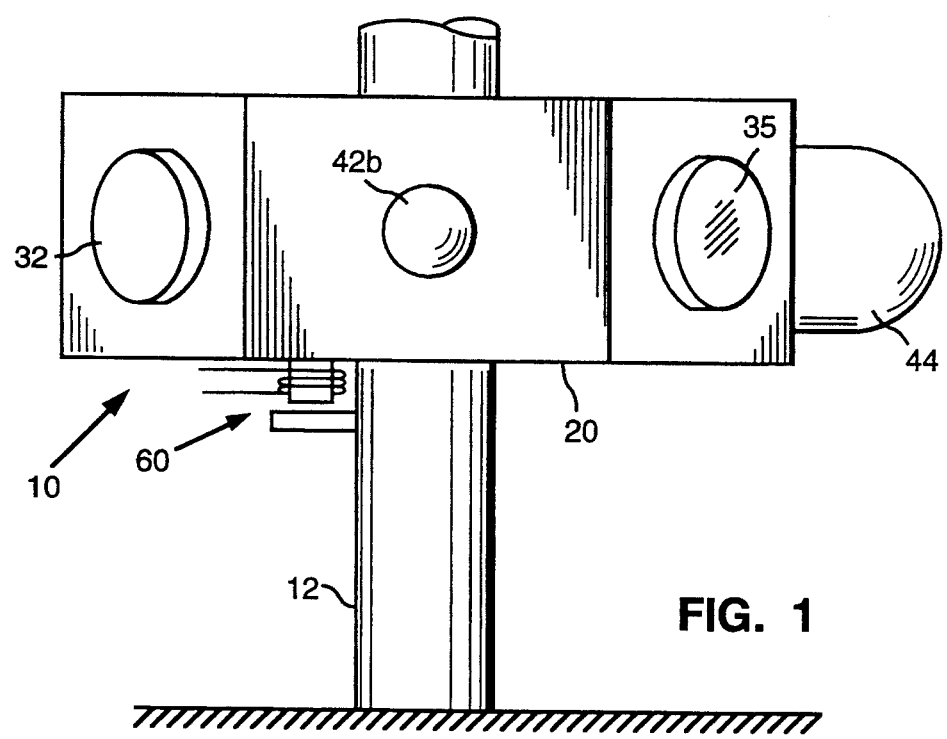
FIG. 1 is a perspective view of a ring laser gyroscope mounted upon a supporting structure.
Figure 2:
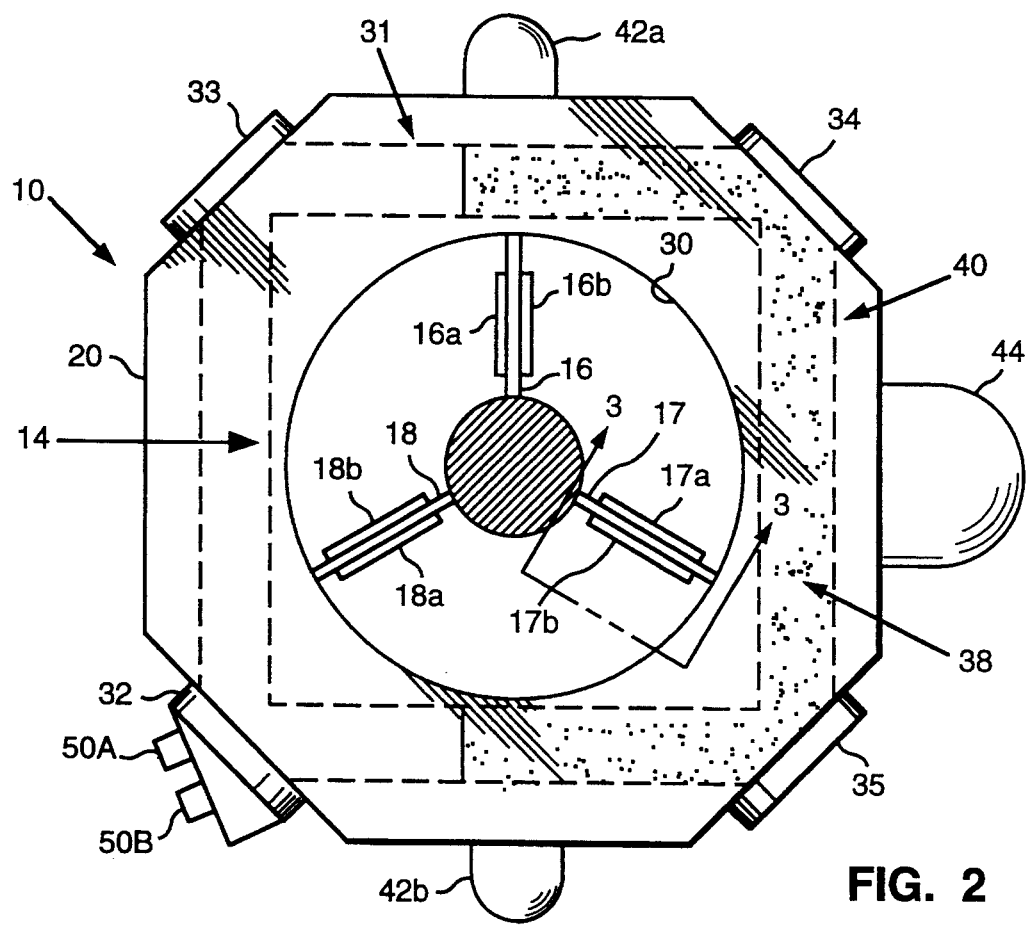
FIG. 2 is a plan view of the ring laser gyroscope of FIG. 1.

A brief description of an exemplary structure for a basic ring laser gyroscope is presented to facilitate an understanding of the present invention. The invention is not limited in its applicability to the ring laser gyroscope described herein. Referring to FIGS. 1 and 2, a ring laser gyroscope 10 is mounted on a support 12. The ring laser gyroscope 10 is exemplary of many such devices with which the present invention may be practiced and does not limit the present invention to the particular embodiment of the ring laser gyroscope 10 shown in FIGS. 1 and 2 and described herein.

Figure 3:
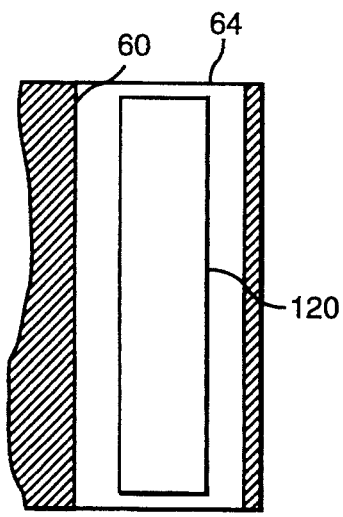
FIG. 3 is a partial cross sectional view along line 3—3 of FIG. 1 showing a piezoelectric driver mounted to a dither spring.

The ring laser gyroscope 10 is supported by a flexure mechanism 14 mounted in a center hole 30 in a frame 20. The flexure 14 comprises a plurality of springs 16–18 connected between the frame 20 and the support 12. The illustrated embodiment includes three springs, but the invention may be practiced with any number of springs. Referring to FIGS. 2 and 3, the springs 16–18 may be formed as thin rectangles, but the present invention is not limited in its applicability to springs having such configurations.

Referring to FIGS. 2 and 3, a pair of piezoelectric wafers 16a, 16b, 17a, 17b, 18a and 18b are mounted on the springs 16–18, respectively. The piezoelectric wafers have generally rectangular configurations and are mounted on opposite sides of the corresponding springs. The piezoelectric wafers are poled such that application of a driving voltage to electrodes on opposite sides thereof causes the piezoelectric wafers to selectively expand or contract. The piezoelectric wafers on each spring may have opposite polarities so that application of the same driving signal thereto causes one wafer to expand while the other wafer contracts. Therefore, the springs 16, 17 and 18 will deform so that the frame 20 oscillates with small amplitude about the support 12.

Referring to FIG. 2, a cavity 31 formed in the frame 20 extends between a plurality of mirrors 32–35, which guide light around a closed path inside the cavity 30. A gain medium 38, which typically comprises a mixture of helium and neon gases lies a region 40 of the cavity 31 between a pair of anodes 42a and 42b. Application of an excitation voltage to the anodes 42a and 42b and a cathode 44 causes energy level transitions in the gas mixture to produce counterpropagating coherent light beams in the cavity 31.

The two counterpropagating bewares undergo phase shifts in circulating around the cavity 31 by successive reflection from the mirrors 32–35 as the frame 20 rotates about its longitudinal axis. The difference in the phase of the two counterpropagating beams is indicative of the rotation rate of the ring laser gyroscope 10 about its sensing axis.

Figure 7:
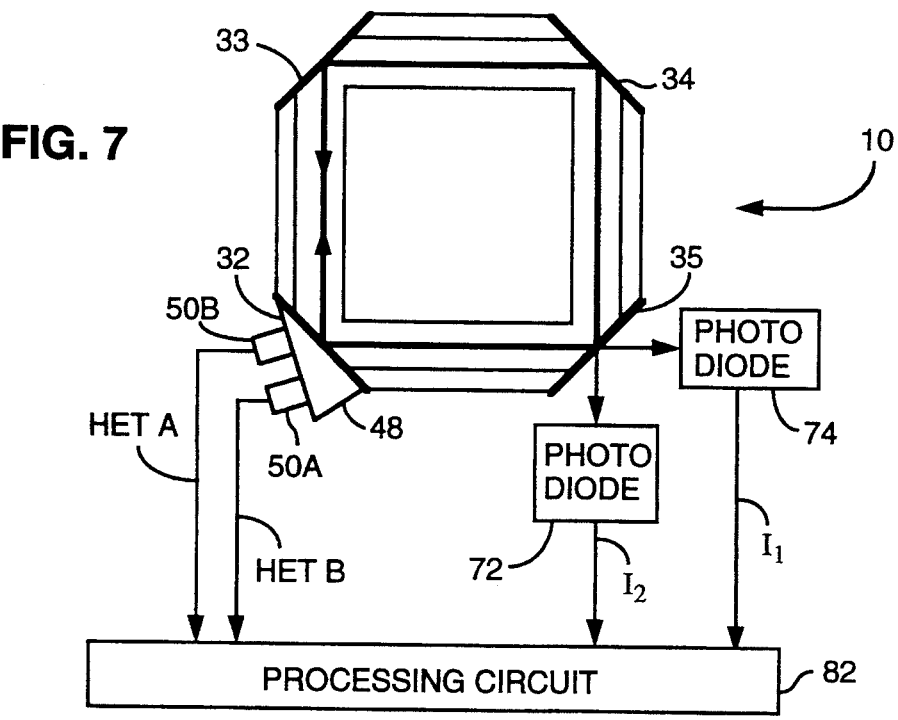
FIG. 7 is a schematic representation of a laser ring laser gyroscope and associated circuitry for determining phase error.

Referring to FIGS. 2 and 7 one of the mirrors, for example the mirror 32, is partly transmissive so that a portion of each beam enters a prism 48 mounted to the back of the mirror 32. The prism 48 is formed to combine, or heterodyne, the counterpropagating beams so that they interfere with one another before impinging upon the pair of photodetectors 50A and 50B. The combined beams produce interference fringes that move across the detectors 50A and 50B. The outputs of the detectors 50A and 50B are generally called heterodyne or "het" signals. The signals output from the detectors 50A and 50B are sometimes referred to herein as heterodyne signals A and B, respectively.

The frequency difference, or beat frequency, of the two beams is seen as motion of the interference fringes across the detectors 50A and 50B. Accordingly, the direction of the motion of the fringes identifies the direction of rotation. Each full cycle of the interference pattern corresponds to $2\pi$ radians of phase of the beat frequency, and, therefore corresponds to a fixed angular rotation increment. Each occurrence of a full cycle of the interference pattern generates a signal called a heterodyne count. For a ring laser gyroscope having a 28 cm path length, the scale factor is about 1.8 arc seconds of rotation per heterodyne count. The two detectors 50A and 50B are located to be ¼ of a fringe apart in order to be able to determine the direction of rotation.

Figure 4:
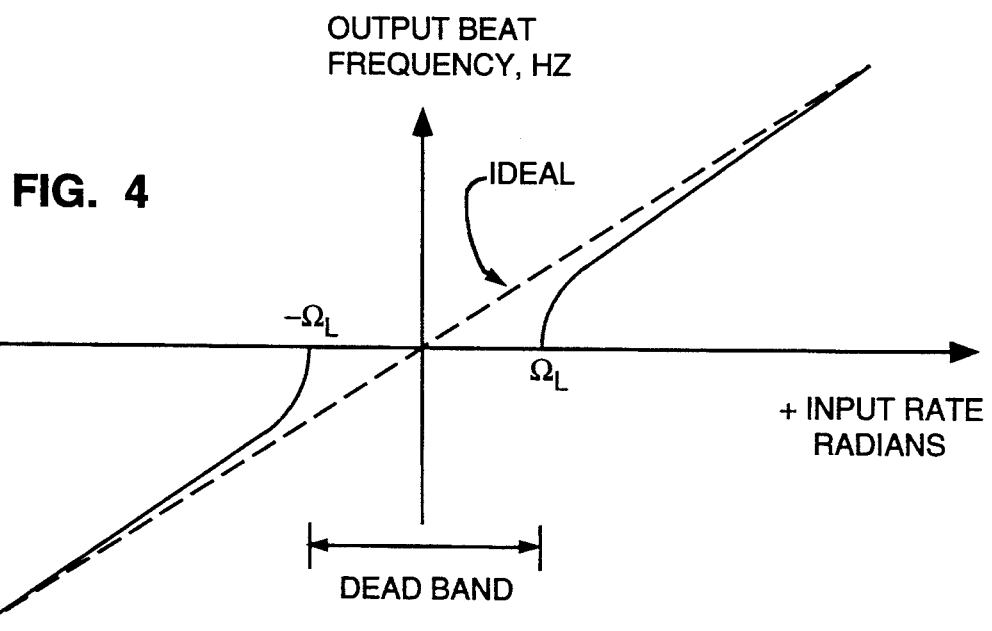
FIG. 4 graphically illustrates the output beat frequency of a ring laser gyroscope as a function of rotation rate.

The frequency of the beat signal produced when the two frequencies heterodyne at the detectors 50A and 50B is directly proportional to the rotation rate of the ring laser gyroscope 10 about its longitudinal axis. Referring to FIG. 4, when the rotation rate of a simple, unbiased ring laser gyroscope 10 is reduced to the lock-in threshold rate $\Omega_L$, the counterpropagating beams lock at the same frequency. The frequencies of the counterpropagating beams are the same for a range of rotation rates $\pm\Omega_L$, which is the lock-in deadband shown in FIG. 4. The signal output from the ring laser gyroscope 10 becomes non-linear in the vicinity of the deadband, which is a departure from the output of an ideal ring laser gyroscope.

Figure 5:
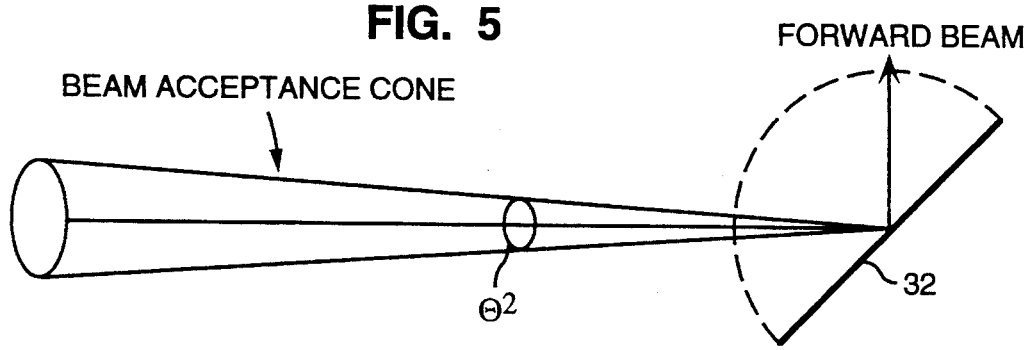
FIG. 5 illustrates forward reflected and backscattered light from a mirror of the type that may be included in the ring laser gyroscope of FIG. 1.

Referring to FIG. 5, lock-in is believed to be caused primarily by radiation backscattered from the mirrors 32–35. Since the counterpropagating beams strike each of the mirrors 32–35 at an angle of incidence of 45° there would be no backscattered radiation from ideal, perfectly flat mirrors. However, even though the mirrors 32–35 are of very high quality, surface imperfections cause some reflection of each beam in all directions. The main portion of each beam is forward reflected from the mirror 32, for example, according to the laws of reflection. Light from one beam that is backscattered into an acceptance solid angle couples to the oppositely directed beam. The acceptance solid angle depends upon the wavelength of the light and the diameter of the cavity 31. For a typical square ring laser gyroscope having a 45° angle of incidence, about one part in $10^6$ of the total specular reflection from any one of the mirrors 32–35 is backscattered into the acceptance angle of the counterpropagating beam.

Referring to FIG. 6A, the output of the detector 50 as a function of time is sinusoidal when the rotation rate is far from the lock-in threshold. Referring to FIG. 6B, when the rotation rate is near the lock-in threshold, the output of the detector 50 is distorted from the desired sinusoidal waveform. For a typical ring laser gyroscope having a cavity length of 49 cm, the lock-in threshold is about 100°/hr. Therefore, obtaining satisfactory results from the ring laser gyroscope 10 requires avoidance not only of lock-in but also avoidance of the rotation rates near the deadband. This is also shown in FIG. 4 where the output beat frequency for rates near the lock-in threshold deviate from the ideal linear relationship.

FIG. 7 shows the frame 20 and a block diagram of a circuit for determining the rotation rate and phase error correction. The mirror 35 transmits part of each beam to photodiodes 72 and 74. The photodiodes 72 and 74 form signals $I_1$ and $I_2$ having magnitudes corresponding to the intensities of the clockwise and counterclockwise beams, respectively. A processing circuit 82 receives the heterodyne signals from the photodiodes 50A, 50B and the beam intensity signals from the diodes 72 and 74 and processes these signals to determine the phase error correction.

The laser ring laser gyroscope 10 is subjected to an oscillation or dither to keep the rotation rate well above the deadband most of the time. For present purposes it is important to note that twice each dither cycle the ring laser gyroscope 10 passes through the deadband. This cyclic recurrence of lock-in at turn-around points of the dither is referred to as "phase error." Although the phase error is small because it lasts for only a very short time, the cumulative result over an extended time may be a significant error.

Thus even when the ring laser gyroscope 10 is dithered, the residual effects of coupling between the counter propagating beams are not negligible. It is theoretically possible to correct the residual dither error by calculating a correction based on the difference of the phases of the two beams at turnaround. The correction is summed with the output counts of the gyroscope. Since the phase difference between the beams is determined by means of optical interference at the heterodyne detector, the two heterodyne detector outputs become the basis for detecting turnarounds. A difficulty with using a turnaround phase difference, $\phi_H$, derived from the heterodyne signals is that the phase difference is offset from the coupling phase by a phase offset, $\epsilon$, that is a function of the optical placement of the heterodyne detectors 50A and 50B.

Figure 8:
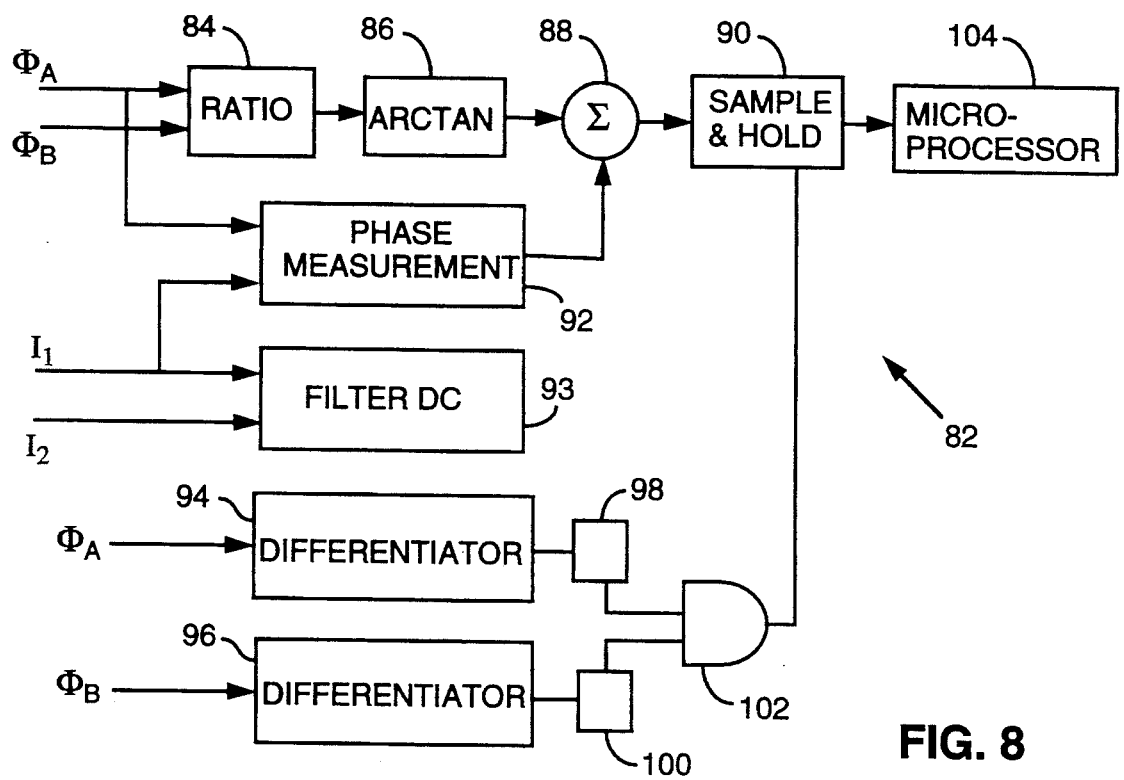
FIG. 8 is a more detailed block diagram of the circuitry of FIG. 7.
Figure 9:
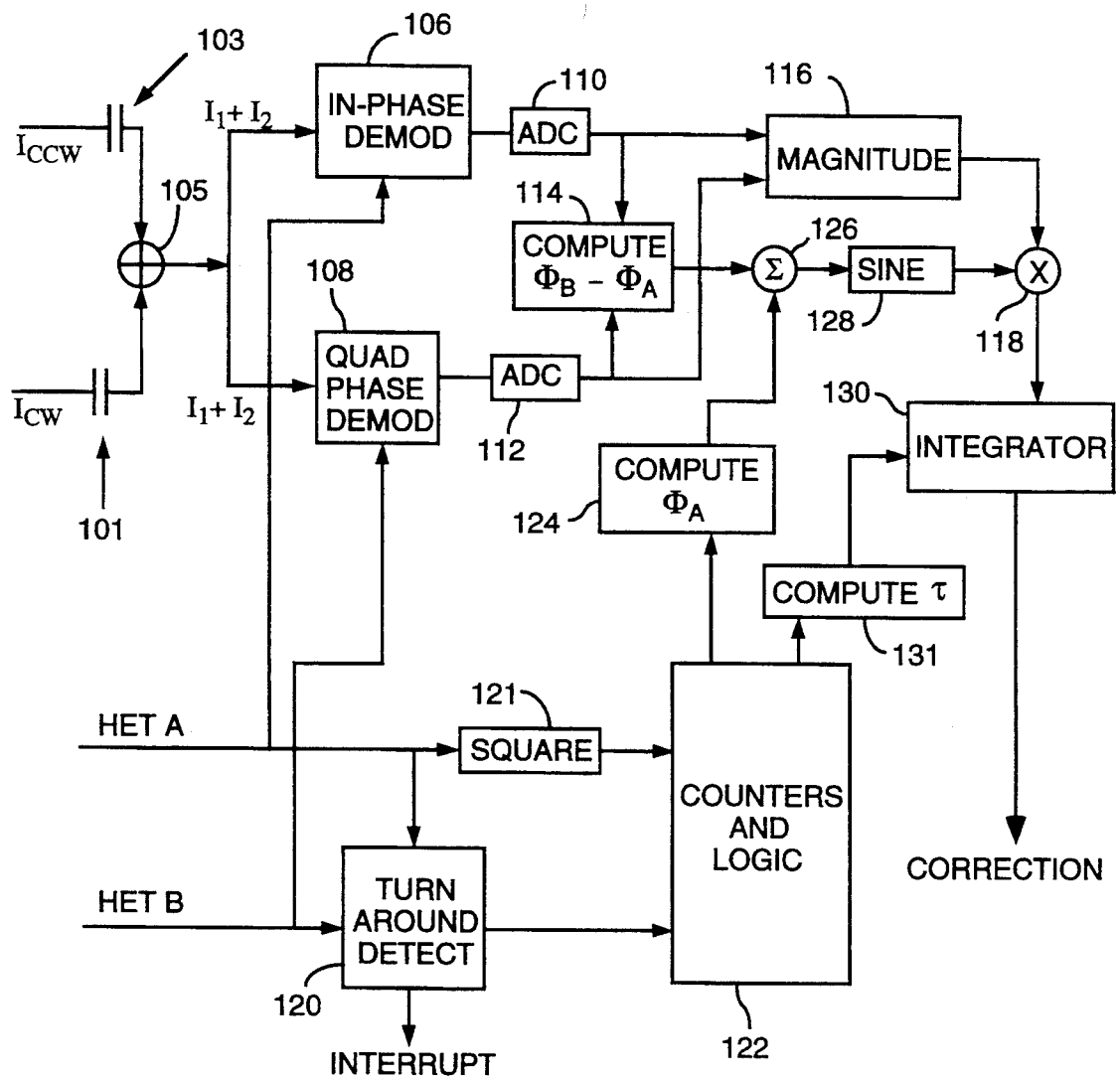
FIG. 9 is a block diagram of phase error correction circuitry.

FIG. 8 is a detailed function block diagram of the processing circuit of FIG. 7. The two sinusoidal signals $\phi_A$ and $\phi_B$ from the heterodyne detectors 72 and 74 are input to a ratio circuit 84, which forms a signal corresponding to the tangent of the phase angle between the signals $\phi_A$ and $\phi_B$. A circuit 86 processes the tangent signal to produce an arctangent signal, which indicates the ring laser gyroscope angle. The phase angle $\epsilon$ between the clockwise beam intensity signal $I_1$ and $\phi_A$ is determined by a phase measurement circuit 92 and combined with the arctangent signal in a summing circuit 88. The output of the summing circuit 88 is the angle of rotation plus the phase offset $\epsilon$ and is fed into a sample and hold circuit 90.

The correction to the gyro output is made only at turnarounds in the rotational motion. Therefore, it is necessary to actuate the sample and hold circuit 90 for a short time at each turnaround and then leave it deactivated throughout the remainder of the cycle. To control the sample and hold circuit 90, the quadrature signals $\phi_A$ and $\phi_B$ are differentiated in a pair of differentiators 94 and 96, respectively. The outputs of the differentiators 94 and 96 are zero at each turnaround and are input to a pair of inverters 98 and 100, respectively. At turnaround the inverters 98 and 100 provide coincident high logic signals to an AND-gate 102. The AND-gate 102 is, therefore conductive at each turnaround to provide a signal that activates the sample and hold circuit 90. The outputs of the inverters 98 and 100 are both logic highs only at turnarounds; therefore the AND-gate 102 and the sample and hold circuit 90 remain deactivated for the rest of the dither cycle.

The values of the angle of rotation plus the phase offset sampled at each dither turnaround are entered into a microprocessor 104 where a value for a correction term is calculated for each of the sampled values. The solutions may be stored for correcting the ring laser gyroscope output data. Optionally, instead of directly calculating the phase error solutions, the circuitry may include a "look-up" table that contains the solutions.

The magnitude of the correction must be properly scaled to the magnitude of the coupling coefficient, $B_L$, between the two beams. Using the processing circuit 70 of FIGS. 7 and 8 assumes that the phase offset $\epsilon$ and the turnaround time are constants for any given ring laser gyroscope. However, in actual practice both the phase offset $\epsilon$ and the coupling coefficient $B_L$ are functions of time and temperature. Therefore, a more accurate determination of the phase error requires a measurement of the phase offset and the coupling coefficient at each turnaround as described subsequently.

Relationships Between Beam Intensities and Lock-In Caused by Phase Shifts

The phase error correction technique described here can be understood by analyzing the time evolution of the phase between the two counterpropagating laser beams while the ring laser gyroscope 10 is being dithered. The output of the ring laser gyroscope 10 may be written as $$\frac{d\psi}{dt} = K\Omega + B_L \sin(\psi + \epsilon) \quad (1)$$

where $\Omega$ is the angle of rotation; $\psi$ is the phase difference between the counterpropagating beams; K is the ring laser gyro scale factor; $B_L$ is the lock-in coefficient and $\epsilon$ is the phase offset determined by placement of the heterodyne detectors. Integrating Eq. (1) over a dither cycle yields $$\psi = K\Omega T + B_L [\sin(\psi_{01}+\epsilon) + \sin(\psi_{02}+\epsilon)]\tau \quad (2)$$

where T is the dither period, $\psi_{01}$ and $\psi_{02}$ are the phases at the two turnarounds in the cycle, and $\tau$ is the turnaround time. The term $B_L[\sin(\psi_{01}+\epsilon)+\sin(\psi_{02}+\epsilon)]\tau$ is the error term that must be evaluated to correct for the errors introduced by lock-in at each turnaround. The variables that must be measured to correct the output of the ring laser gyroscope are the phases $\psi_{01}$ and $\psi_{02}$, the turnaround time $\tau$, the lock-in coefficient $B_L$ and the phase offset $\epsilon$.

Typically ring laser gyroscope 10 is outside the lock-in band for nearly all the dither cycle. However, as has already been noted, the ring laser gyroscope passes through the lock-in band when the net rotation rate is near zero. The net rotation rate is the dither plus the external rotation rate. At very low external rotation rates lockin occurs at the dither turnarounds. In order to provide an adequate correction, the present invention detects true inertial rotation rate turn around rather than just dither turnaround.

At low angular rotation rates where the true inertial rotation rate turnarounds occur near turnarounds of the dither cycles, the rate error may be expressed as $$\delta\psi = \frac{2cD}{L}\sin(\psi + P_D) + \frac{2c^2H^2}{L^2\omega_g}\sin(2\psi + 2P_H) \quad (3)$$

where $\dot{\psi}$ = rate of change of the phase angle $\psi$;
L = path length around ring laser gyroscope;
D = amplitude of dielectric variation scattering losses;
H = amplitude of height variation scattering losses;
$P_D$ = asymmetry phase of dielectric losses;
$P_H$ = asymmetry phase of height variation losses; and
c = free space velocity of light.

The frequency $\omega_g$ is $$\omega_g = \frac{ac(\beta - \theta)}{L(\beta + \theta)} \quad (4)$$

where a is the small signal gain and $\beta$ and $\theta$ are saturation and cross saturation terms.

The time varying parts of the beam intensities are $$I_{cw} = I_1\cos(\psi + t_2 + P_D) + i_1\sin(\psi + t_1 + P_H) \quad (5)$$

$$I_{ccw} = I_1\cos(\psi + t_2 + P_D) - i_1\sin(\psi + t_1 + P_H) \quad (6)$$

where $$I_1 = \frac{2DI_oc}{L(\omega^2 + \omega_a^2)^{\frac{1}{2}}}; \quad (7)$$

$$i_1 = \frac{2HI_oc}{L(\omega^2 + \omega_g^2)^{\frac{1}{2}}}; \quad (8)$$

$$\sin(t_2) = \frac{-\omega}{(\omega^2 + \omega_a^2)^{\frac{1}{2}}}; \quad (9)$$

$$\sin(t_1) = \frac{-\omega}{(\omega^2 + \omega_g^2)^{\frac{1}{2}}}; \quad (10)$$

$$\omega_a = \frac{ac}{L}; \quad (11)$$

and $$\omega = K\Omega. \quad (11a)$$

Evaluating Eqs. (5) and (6) for values of $\omega$ near zero gives $$I_{cw}(0) = \frac{2DcI_o}{L\omega_a}\cos(\psi + P_D) + \frac{2H}{L\omega_g}\sin(\psi + P_H) \quad (12)$$

and $$I_{ccw}(0) = \frac{2DcI_o}{L\omega_a}\cos(\psi + P_D) - \frac{2H}{L\omega_g}\sin(\psi + P_H). \quad (13)$$

Working with the sum and difference of the time varying intensities near zero rates gives $$I(0) = 0.5[I_{cw}(0) + I_{ccw}(0)] \quad (14)$$

$$= \frac{2I_oDc}{L\omega_a}\cos(\psi + P_D) \quad (15)$$

$$i(0) = 0.5[I_{cw}(0) - I_{ccw}(0)] \quad (16)$$

$$= \frac{2I_oDc}{L\omega_g}\sin(\psi + P_H). \quad (17)$$

The above expressions may be simplified by defining M(0) and m(0) such that $$\frac{2I(0)}{I_o} = M(0)\cos(\psi + P_D) \quad (18)$$

and $$\frac{i(0)}{I_o} = m(0)\sin(\psi + P_H). \quad (19)$$

The rate error of Equation (3) then is $$\delta\psi(0) = M(0)\omega_a\sin(\psi + P_D) + (\tfrac{1}{2})m^2(0)\sin(2\psi + 2P_H). \quad (20)$$

Now let $\Phi_D$ and $\Phi_H$ be the phases of the sum and difference modulations such that $$\frac{I(0)}{I_o} = M(0)\sin\phi_D \quad (21)$$

and $$\frac{i(0)}{I_o} = m(0)\sin\phi_H. \quad (22)$$

The phase difference becomes $$\delta\psi(0) = M(0)\omega_a\sin(\phi_D - \pi/2) + \tfrac{1}{2}m^2(0)\omega_g\sin(2\phi_H). \quad (23)$$

The phase error at turnaround of the dither cycle can be expressed as $$\delta\psi = \delta\dot\psi \tau \quad (24)$$

where $$\tau = [\pi/(K\alpha_0)]^{\frac{1}{2}} \quad (25)$$

with $\alpha_0$ being the angular acceleration at turnaround.

For body dither at low input rates the angular acceleration at turnaround may be expressed as $$\alpha_o = \frac{2\pi\omega_d}{T} \quad (26)$$

where $\omega_d$ is the dither maximum angular rate, $\omega$ is the dither angular frequency and T has been defined above.

The phase error at turnaround can be expressed as $$\delta\psi = \quad (27)$$

$$[\pi(\omega_d\omega) - 1]^{\frac{1}{2}}\left[M_o\omega_a\sin\left(\phi_o - \frac{\pi}{2} + (1/2)m^2(0)\omega_g\sin(2\phi_H)\right)\right].$$

The variables $\Phi_D$ and $\Phi_H$, the phases of the sum and difference modulations are not easily measured system observables. However $\Phi_A$ and $\Phi_B$, which are the phases of the heterodyne A and heterodyne B optical signals, respectively, are measurable as are the relative phases between $\Phi_A$ (or $\Phi_B$) and $\Phi_D$ (or $\Phi_H$). The two heterodyne signals are characterized by the equations $$S_A = a_A \sin \Phi_A; \tag{28}$$

$$S_B = a_A \sin \Phi_B; \tag{29}$$

and $$\phi_B = \phi_A + \frac{\pi}{2} + \delta. \tag{30}$$

If $\delta$ is small, then to first order $$\phi_A = \tan^{-1} \frac{S_A a_B}{S_B a_A}. \tag{31}$$

The quadrant can be determined by the signs of $S_A$ and $S_B$. Therefore, the amplitudes of the two heterodyne signals at the moment of turnaround are measured to determine the heterodyne phase at turnaround.

FIG. 8 is a functional block diagram of a circuit for implementing phase error correction. It is assumed that the phase error is dominated by dielectric type scattering and that therefore only the first term of Eq. (27) need be considered.

A signal $I_{cw}$ indicative of the intensity of the clockwise beam is input to a capacitor 101, which filters the DC component from the signal. Similarly, a signal $I_{ccw}$ indicative of the intensity of the counter clockwise beam is input to a capacitor 103 to filter out the DC component. The filtered intensity signals are input to a summing circuit 105, and an intensity sum signal $I_1 + I_2$ is input to both an in-phase demodulator 106 and a quadrature phase demodulator 108. The circuit 105 may be configured to output an intensity difference signal $I_2 - I_1$ rather than the intensity sum signal.

The signal het A from the heterodyne detector 50A is input to the in-phase demodulator 106, and a signal het B from the heterodyne detector 50B is input to the quadrature phase demodulator 108. The output of the in-phase demodulator 106 and the quadrature phase demodulator 108 are input to a first analog-to-digital converter 110 and a second analog to digital converter 112, respectively. The outputs of the analog to digital converters 110 and 112 are input to a circuit 114, which produces an output indicative of the phase difference between the intensity sum signal $I_1 + I_2$ and the signal het A.

The outputs of the analog to digital converters 110 and 112 are also input to a circuit 116 that provides an output indicative of the magnitude of the sum of the clockwise and counterclockwise beams. This magnitude signal is then input to a multiplier 118.

The het A and het B signals are also input to turnaround detector circuit 120, which processes the het A and het B signals to determine the times at which the turnarounds of the dither motion occur. The square of the het A signal and the output of the turnaround detector are input to a counting and logic circuit 122. The logic circuit 122 detects rising edges in the square of the het A signal and produces a trigger signal at the turnarounds. The trigger signal output from the counting and logic circuit 122 is input to a computation circuit 124, which computes the phase $\Phi_A$ of het A at each turnaround. The output of the computation circuit 124 is then input to a summing circuit 126, which also receives an input from the summing circuit 114. Therefore, one input to the summing circuit 126 is the difference $\Phi_D - \Phi_A$ between the phase of the intensity sum signal and het A. The other input to the summing circuit 126 is the phase $\Phi_A$ of het A. Therefore, the output of the summing circuit 126 is a signal indicative of the phase angle $\Phi_D$.

The output of the summing circuit 126 is input to a circuit 128, which determines the value of the sine of the angle $\Phi_D$. The circuit 128 may comprise either means for computing the sine of the angle $\Phi_D$ or it may comprise a look up table, which is preferably a digital read only memory. The output of the circuit 128 is input to the multiplier 118, which produces a signal indicative of the product of the magnitude signal from the circuit 116 and $\sin \Phi_D$. The output of the multiplying circuit 118 is then input to an integrator 130, which produces a signal indicative of the phase angle correction.

The counting and logic circuit 122 can also produce a signal indicative of the duration $\tau$ of the turnaround. The time between successive zero-crossings of the het A or het B signals can be input to a computation circuit 131 that determines the angular acceleration, and from Equation (25) the turnaround duration can be calculated.

The functions of the summing circuit 116, the computation circuit 114, the summing circuit 126, the computation circuit 124, the multiplying circuit 118, the computation circuit 131 and the integrator 130 are preferably implemented in a digital microprocessor.

The microprocessor samples each demodulated output and computes the angle between the het A signal and the intensity sum modulation. The square of the het A signal enters the logic and counting 122 circuit, which detects rising edges in the squared het A signal. The circuit 122 is configured to count the time intervals between the rising edges of the het A signal and to dump the count into memory when the time interval coincides with a turnaround. The turnaround detector 120 is also connected to an interrupt input of the microprocessor to trigger processing of the counted turnaround times.

If input rotation rates are low, the turnaround detector signal may be derived from the magnetic pickoff signal. At higher rates the dither turnarounds and inertial turnarounds do not coincide. In that case a detect scheme based on the het signals themselves is needed.

The software processes the count and computes the het A phase at turnaround. Using the counted time intervals and the phase of the intensity modulation, the phase of the lock-in term is computed. The sine of this angle is multiplied by a scale factor derived from a measurement of M(0), which is obtained also from the outputs of the demodulators 106 and 108 and also multiplied by the duration of the turnaround, which is determined by the software from the times between successive zero-crossings of the het signal. The result is a measure of the error for that turnaround. This error is integrated to give the net angle correction due to phase error at dither turnarounds.

All required signals for computing phase error compensation, according to this invention are present in the current ring laser gyroscope designs. Due to the need for computation at every dither turnaround (800/sec), microprocessor processing is desirable.

The present invention virtually eliminates random walk caused by body dither and allows operation of the ring laser gyroscope 10 near its quantum noise limit. Therefore, the present invention provides significant advantages over previous ring laser gyroscope designs. Small ring laser gyroscopes for medium and high accuracy applications may be operated in a dithered mode using the invention. Previous small ring laser gyroscopes having an optical path length of about 8 to 12 cm could not be dithered because large errors were introduced. The dither amplitude and frequency may be reduced without detriment to system performance.

The present invention also permits increased yield in the production of ring laser gyroscopes. Presently a ring laser gyroscope is assembled and then tested. If it does not perform to specifications, it must be either disassembled and rebuilt or discarded. The present invention determines phase angle errors in the output of any body dithered ring laser gyroscope and corrects for such errors.

What is claimed is:

1. A ring laser gyroscope having a frame with a cavity therein for guiding a first light beam having an intensity $I_1$ in a clockwise direction around the cavity and a second light beam having an intensity $I_2$ in a counterclockwise direction around the cavity, the ring laser gyroscope being dithered in a dither cycle at a vibration frequency and a vibration amplitude, comprising:

means for heterodyning the first and second beams to produce a pair of quadrature heterodyne signals that are functions of the angular output of the ring laser gyroscope;

phase measuring means for determining a phase signal indicative of the phase angle between a signal selected from the heterodyne signals and a signal selected from an intensity sum signal $I_1 + I_2$ and an intensity difference signal indicative of $I_1 - I_2$;

means for combining the chosen heterodyne signal and the phase signal to determine a phase error signal; and means for processing the phase error signal to produce a control signal for adjusting the output of the ring laser gyroscope to correct for errors introduced at turnarounds in the rotational motion of the ring laser gyroscope.

2. The ring laser gyroscope of claim 1, further including:

means for detecting inertial turnarounds in the rotational motion of the frame; and means for adjusting the output of the ring laser gyroscope only during the inertial turnarounds.

3. The ring laser gyroscope of claim 2, further including means for determining a time duration of each turnaround in the dither cycle.

4. The ring laser gyroscope of claim 1 wherein the phase measuring means comprises:

means for extracting a portion of each of the clockwise and counterclockwise beams from the cavity;

means for forming electrical signals indicative of the intensities of the clockwise and counterclockwise beams;

means for producing an intensity sum signal or an intensity difference signal indicative of either the sum or difference, respectively, of intensities of the clockwise and counterclockwise beams; and demodulator means for processing a signal selected from the intensity sum and intensity difference signals to produce a signal indicative of the phase of the selected signal relative to the heterodyne signals.

5. The ring laser gyroscope of claim I wherein the means for processing the phase error signal to produce a control signal for adjusting the output of the ring laser gyroscope to correct for errors introduced at turnarounds in the dither cycle includes:

means for determining the sine of the phase error angle;

means for determining the magnitude of a lock-in coefficient;

means for determining the product of the sine of the phase error angle and the magnitude of the lock-in coefficient;

means for measuring the time required for each turnaround in the dither cycle; and means for integrating the product of the sine of the phase error angle and the magnitude of a lock-in coefficient over the time required for each turnaround in the dither cycle.

6. The ring laser gyroscope of claim 5 wherein the means for determining the time required for each turnaround comprises means for measuring zero crossings in the heterodyne signals.

7. A method for correcting errors introduced by lock-in of a dithered ring laser gyroscope having a frame with a cavity therein for guiding a first light beam having an intensity $I_1$ in a clockwise direction around the cavity and a second light beam having an intensity $I_2$ in a counterclockwise direction around the cavity, comprising the steps of:

dithering the ring laser gyroscope in a dither cycle at a vibration frequency $\omega$ and a vibration amplitude d;

heterodyning the first and second beams to produce a pair of quadrature heterodyne signals that are functions of the angular output of the ring laser gyroscope;

determining a phase signal indicative of the phase angle between a signal selected from the heterodyne signals and a signal selected from an intensity sum signal indicative of $I_1 + I_2$ and an intensity difference signal indicative of $I_1 - I_2$;

combining the chosen heterodyne signal and the phase signal to determine a phase error signal; and processing the phase error signal to produce a control signal for adjusting the output of the ring laser gyroscope to correct for errors introduced at turnarounds in the rotational motion of the ring laser gyroscope.

8. The method of claim 7, further including the steps of:

means for detecting turnarounds in the dither cycle; and means for adjusting the output of the ring laser gyroscope only during turnarounds in the dither cycle.

9. The method of claim 8, further including the step of determining a time duration of each turnaround in the dither cycle.

10. The method of claim 7, wherein the phase measuring means comprises the steps of:

extracting a portion of each of the clockwise and counterclockwise beams from the cavity;

forming electrical signals indicative of the intensities of the clockwise and counterclockwise beams;

adding the electrical signals indicative of the intensities of the clockwise and counterclockwise beams;

producing an intensity sum signal indicative of $I_1 + I_2$;

producing a signal indicative $\Phi_D$ of the phase of the intensity sum signal in combination with a selected one of the heterodyne signals; and processing the signal $\Phi_D$ and the phase of the selected heterodyne signal to compute the phase of the signals $\Phi_S$ and $\Phi_D$.

11. The method of claim 7, wherein the step of processing the phase error signal to produce a control signal for adjusting the output of the ring laser gyroscope includes the steps of:
determining the sine of the phase error angle;
determining the magnitude of a lock-in coefficient;
determining the product of the sine of the phase error angle and the magnitude of the lock-in coefficient;
measuring the time required for each turnaround in the dither cycle; and
integrating the product of the sine of the phase error angle and the magnitude of a lock-in coefficient over the time required for each turnaround in the dither cycle.

12. The method of claim 11, wherein the step of determining the time required for each turnaround comprises the step of measuring zero crossings in the output of the heterodyne signals.

13. A ring laser gyroscope having a frame with a cavity therein for guiding a pair of counterpropagating beams, the ring laser gyroscope having a lock-in frequency, comprising:
means for dithering the ring laser gyroscope in a cycle at a vibration frequency and a vibration amplitude;
means for heterodyning the beams to produce a pair of quadrature signals that are functions of the angular output of the laser ring laser gyroscope;
means for producing a pair of beam intensity signals $I_1$ and $I_2$ indicative of the intensity of each beam;
means for determining a signal indicative of either the sum of the beam intensity signals or the difference of the beam intensity signals;
means for determining the phase of a selected one of the heterodyne signals;
means for determining a phase difference signal between the selected heterodyne signal and a signal selected from the beam intensity sum signal and the beam intensity difference signals;
means for adding a signal indicative of the phase of the selected heterodyne signal to the phase difference signal to determine a phase error signal;
means for determining a value of a lock-in coefficient at each turnaround in the dither cycle;
means for detecting turnarounds in the dither cycle;
means for measuring the time duration for each turnaround; and
means for determining a correction to the output of the ring laser gyroscope by integrating product of the sine phase error signal by the lock-in coefficient over the time duration of each dither cycle.

14. A method for correcting for lock-in induced errors in the output of a ring laser gyroscope having a frame with a cavity therein for guiding a pair of counterpropagating light beams, the ring laser gyroscope having a lock-in frequency, comprising the steps of:
dithering the ring laser gyroscope in a cycle at a vibration frequency and a vibration amplitude;
heterodyning the beams to produce a pair of quadrature heterodyne signals that are functions of the angular output of the laser ring laser gyroscope;
producing a pair of beam intensity signals $I_1$ and $I_2$ indicative of the intensity of each beam;
determining a signal indicative of either the sum of the beam intensity signals or the difference of the beam intensity signals;
means for determining the phase of a signal selected from the heterodyne signals;
determining a phase difference signal between the selected heterodyne signal and a signal selected from the beam intensity sum signal and the beam intensity difference signals;
adding a signal indicative of the phase of the selected heterodyne signal to the phase difference signal to determine a phase error signal;
determining a value of a lock-in coefficient at each turnaround in the dither cycle;
detecting turnarounds in the dither cycle;
measuring the time duration for each turnaround; and
determining a correction to the output of the ring laser gyroscope by integrating product of the sine of the phase error signal of the by lock-in coefficient over the time duration of each dither cycle.

15. A ring laser gyroscope having a frame with a cavity therein for guiding a pair of counterpropagating beams, means for extracting and heterodyning the beams to produce a pair of quadrature signals indicative of the angular output of the laser ring laser gyroscope, and means for extracting portions of the beams from the cavity signals $I_1$ and $I_2$ indicative of the intensity of each beam, comprising:
means for dithering the ring laser gyroscope at a selected vibration frequency and a selected vibration amplitude;
means for forming a signal indicative of the ratio heterodyne signals;
means responsive to the signal indicative of the ratio of the heterodyne signals for producing a signal indicative of the angle of rotation;
phase measuring means responsive to the one of the heterodyne signals and one of the beam intensity signals for determining the phase offset therebetween;
means for producing a sum signal indicative of the sum of the rotation angle and the phase offset;
means for generating control signal at each turnaround in the dither motion;
a sample and hold circuit connected to receive the sum signal and the turnaround control signal as inputs, the sample and hold circuit being activated by the turnaround control signal to read the sum signal at the turnarounds; and
means for processing the output of the sample and hold circuit to determine the error introduced in the ring laser gyroscope output at each turnaround.

16. The ring laser gyroscope of claim 15 wherein the means for generating a control signal includes:
means for differentiating the heterodyne signals; and
means for processing the output of the differentiating means to form a control signal only at each turnaround.

17. A method of determining and compensating for lock-in error at turnaround in a dithered ring laser gyroscope having a cavity that guides a pair of counterpropagating light beams, the ring laser gyroscope including means for extracting the beams from the cavity and heterodyning the beams to produce a pair of quadrature signals indicative of the angular output of the ring laser gyroscope, and means for extracting the beams and producing signals $I_1$ and $I_2$ indicative of the intensity of each beam, comprising the steps of:

producing a signal indicative of the ratio of the heterodyne signals;

producing a signal indicative of the angle of rotation with means responsive to the signal indicative of the ratio of the heterodyne signals and one of the beam intensity signals;

determining the phase offset between a selected one of the heterodyne signals and one of the beam intensity signals;

producing a sum signal indicative of the sum of the rotation angle and the phase offset;

generating a control signal at each turnaround in the dither motion;

connecting a sample and hold circuit to receive the sum signal and the turnaround control signal as inputs;

activating the sample and hold circuit by the turnaround control signal to read the sum signal at the turnarounds; and connecting means to the sample and hold circuit for determining the error introduced in the ring laser gyroscope output at each turnaround.

18. The method of claim 18 wherein the step of generating a control signal includes the steps of:

differentiating the heterodyne signals; and processing the differentiated heterodyne signals to determine simultaneous zero-crossings therein to form a control signal only at vibration turnaround.

* * * * *